(12) United States Patent
Wang et al.

(10) Patent No.: US 11,830,114 B2
(45) Date of Patent: Nov. 28, 2023

(54) RECONFIGURABLE HARDWARE ACCELERATION METHOD AND SYSTEM FOR GAUSSIAN PYRAMID CONSTRUCTION

(71) Applicant: HUAZHONG UNIVERSITY OF SCIENCE AND TECHNOLOGY, Hubei (CN)

(72) Inventors: Chao Wang, Hubei (CN); Guoyi Yu, Hubei (CN); Yi Zhan, Hubei (CN); Bingqiang Liu, Hubei (CN); Xiaofeng Hu, Hubei (CN); Zihao Wang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 84 days.

(21) Appl. No.: 17/732,476

(22) Filed: Apr. 28, 2022

(65) Prior Publication Data

US 2022/0351432 A1 Nov. 3, 2022

(30) Foreign Application Priority Data

Apr. 30, 2021 (CN) .......................... 202110484312.4

(51) Int. Cl.
*G06F 17/15* (2006.01)
*G06T 1/60* (2006.01)
(Continued)

(52) U.S. Cl.
CPC .............. *G06T 11/40* (2013.01); *G06F 17/15* (2013.01); *G06T 1/60* (2013.01); *G06T 3/403* (2013.01); *G06T 2200/28* (2013.01)

(58) Field of Classification Search
None
See application file for complete search history.

(56) References Cited

U.S. PATENT DOCUMENTS 6,188,381 B1 * 2/2001 van der Wal ............. G06T 1/20
345/554
2012/0183224 A1 * 7/2012 Kirsch ....................... G06T 7/00
382/224

(Continued)

OTHER PUBLICATIONS

Feng-Cheng Huang et al., "High-Performance SIFT Hardware Accelerator for Real-Time Image Feature Extraction", IEEE Transactions on Circuits and Systems for Video Technology, Mar. 2012, pp. 1-13.

*Primary Examiner* — Joni Hsu
(74) *Attorney, Agent, or Firm* — JCIPRNET

(57) ABSTRACT

The disclosure discloses a reconfigurable hardware acceleration method and system for Gaussian pyramid construction and belongs to the field of hardware accelerator design. The system provided by the disclosure includes a static random access memory (SRAM) bank, a first in first out (FIFO) group, a switch network, a shift register array, an adder tree module, a demultiplexer, a reconfigurable PE array, and a Gaussian difference module. In the disclosure, according to the requirements of different scenarios and different tasks for the system, reconfigurable PE array resources can be configured to realize convolution calculations of different scales. The disclosure includes methods of fast and slow dual clock domain design, dynamic edge padding design, and input image partial sum reusing design.

9 Claims, 7 Drawing Sheets

(51) Int. Cl.
   *G06T 11/40*   (2006.01)
   *G06T 3/40*    (2006.01)

(56) References Cited

U.S. PATENT DOCUMENTS

| | | | |
|---|---|---|---|
| 2018/0005075 A1* | 1/2018 | Shacham | G06F 9/30032 |
| 2018/0018770 A1* | 1/2018 | Hu | G06T 7/97 |
| 2018/0157962 A1* | 6/2018 | Henry | G06N 3/045 |
| 2021/0125313 A1* | 4/2021 | Bai | G06T 5/004 |

\* cited by examiner

Storing pixels in an original image in a plurality of SRAM banks in a form of a line buffer under a slow clock domain and outputting, by the SRAM banks, pixel values to be convolved in parallel

↓

Achieving, through 5 groups of FIFO, transformation from the slow clock domain to a fast clock domain

↓

Adjusting, through a switch network, the pixel values outputted by the groups of FIFO in order and storing the pixel values in a shift register array column by column in the fast clock domain

↓

Controlling a multiplexer MUX by using a current convolution center pixel value position and selecting input of an adder tree as a pixel value in a shift register group or a value in an edge padding register, so as to achieve various types of reconfigurable edge padding, including zero-valued edge padding, constant edge padding, or repeated edge padding in the fast clock domain

↓

Performing, by the adder tree, time division multiplexing within one SRAM reading time and adding pixel values in a pixel matrix to be convolved multiplied by a same weight first to obtain partial sums that can be reused by convolution of different scales of a Gaussian pyramid in the fast clock domain

↓

Reconfiguring reconfigurable PE arrays and configuring an appropriate number of reconfigurable PE Arrays according to different scenarios and different tasks' requirements for system performance, where the partial sums enter one or several reconfigurable PE arrays through a demultiplexer DEMUX, the reconfigurable PE arrays perform time division multiplexing in the readout time of one column of pixel values for the SRAM banks at a time to achieve convolution operations of different scales and to construct the Gaussian pyramid in the fast clock domain Entering, by output of the reconfigurable PE arrays, a Gaussian difference module to construct the Gaussian pyramid in the fast clock domain

FIG. 2

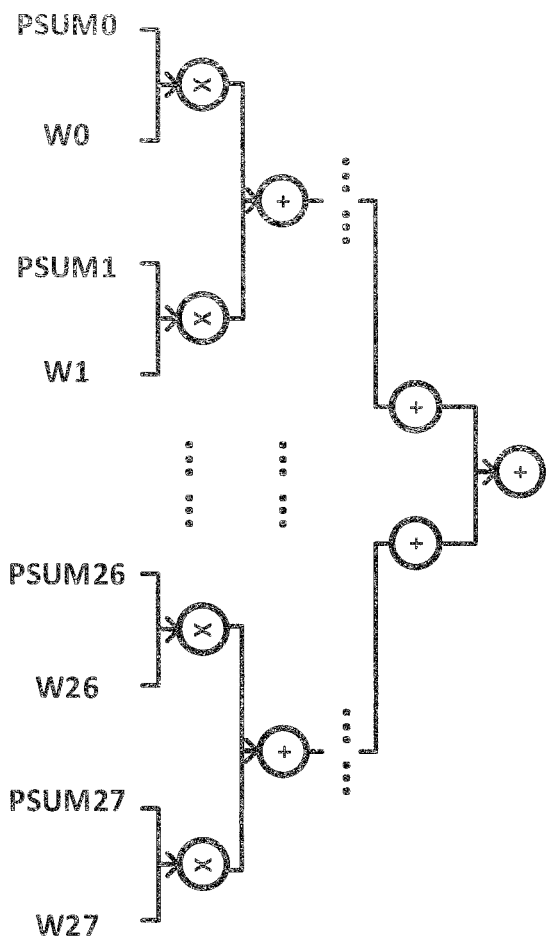
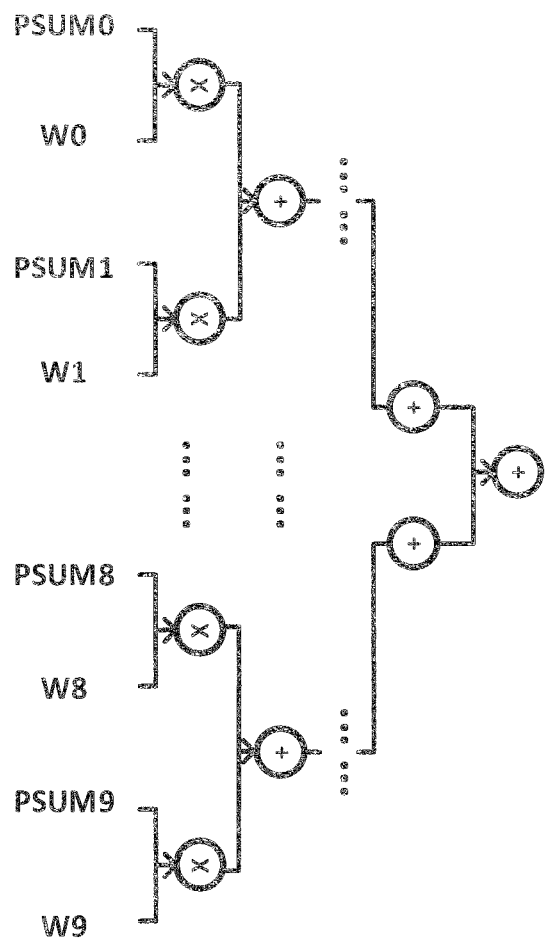
Reconfigurable PE array 1    Reconfigurable PE array 2
FIG.6

RECONFIGURABLE HARDWARE ACCELERATION METHOD AND SYSTEM FOR GAUSSIAN PYRAMID CONSTRUCTION

CROSS-REFERENCE TO RELATED APPLICATION

This application claims the priority benefit of China application no. 202110484312.4, filed on Apr. 30, 2021. The entirety of the above-mentioned patent application is hereby incorporated by reference herein and made a part of this specification.

BACKGROUND

Technical Field

The disclosure belongs to the field of hardware accelerator design, and more particularly, relates to a reconfigurable hardware acceleration method and system for Gaussian pyramid construction.

Description of Related Art

Scale-invariant feature transform (SIFT) is a local feature description algorithm, through which the matching problem of two images due to translation, rotation, affine transformation, etc. can be solved. SIFT has good invariance and strong matching ability. The algorithm converts an image into a collection with a large number of local feature vectors. This algorithm can still obtain relatively reliable matching results under the conditions of image affine changes, 3D viewing angle changes, scaling, exposure changes, and noise addition. Therefore, the algorithm is widely used in robotics, drones, autonomous driving, virtual reality, augmented reality, computer vision, and other fields.

With the improvement of image clarity and the real-time needs for graphics matching, object tracking, and other applications, conventional software-based SIFT algorithms can no longer meet these needs, and the designing dedicated hardware accelerators for SIFT algorithms have become a current research hotspot. Since the construction of the Gaussian pyramid accounts for more than half of the computational load and energy consumption in the SIFT algorithm, the hardware acceleration of the Gaussian pyramid construction is the most critical.

The document "High-Performance SIFT Hardware Accelerator for Real-Time Image Feature Extraction" (Huang, F. C., et al. IEEE Transactions on Circuits & Systems for Video Technology 22.3(2012):340-351) introduces a method of Gaussian pyramid construction based on fully parallel computing, and the method is able to achieve high real-time Gaussian pyramid construction. However, due to the mismatch between the data reading and writing speed with and the data calculating speed, that is, the reading and writing speed of the memory is slow, and the speed of the computational unit is fast, so that the computational unit has a long idle time after completing the computation, resulting in significant hardware overhead and low hardware utilization rate. In addition, the symmetry of the Gaussian function is not considered in this method, resulting in a large amount of calculation and hardware overhead. Further, this method does not consider edge padding during convolution, so that the output images have different degrees of distortion.

SUMMARY

The disclosure provides a reconfigurable hardware acceleration method for Gaussian pyramid construction, and the method includes the following steps.

In step S1, pixel data of an original image is stored in a form of a line buffer, and a pixel matrix to be convolved is outputted in parallel column by column.

In step S2, a row order of the pixel matrix to be convoluted is adjusted, such that the pixel data written before is not covered.

In step S3, whether or not to perform edge padding and data for the edge padding are determined by the coordinate information of the center pixel of the pixel matrix to be convoluted.

In step S4, pixel values multiplied by a same weight in a Gaussian convolution kernel in pixel matrix to be convoluted are added first to obtain partial sums that can be reused by different Gaussian convolution kernels, a Gaussian convolution operation of M different scale coefficients is completed based on the partial sums to form an octave of Gaussian images, and a plurality of octaves of Gaussian images form a Gaussian pyramid.

In step S5, Gaussian images of different scale coefficients in the same octave of Gaussian images are differed to form an octave of Gaussian difference images, and a plurality of groups of Gaussian difference images form a Gaussian difference pyramid.

Preferably, since a static random access memory (SRAM) cache exhibits a slow reading and writing speed, while a computational unit exhibits a fast speed, by utilizing the mismatch (assuming that the speed of the computational unit is P times the reading and writing speed of the SRAM) between the speed of the memory and the speed of the computational unit, a fast and slow dual clock domain design method is provided. To be specific, the pixel matrix to be convolved outputted in step S1 first undergoes a transformation from a slow clock domain to a fast clock domain. As such, an adder tree module, a demultiplexer, a plurality of reconfigurable processing element (PE) arrays, and a Gaussian difference module performs time division multiplexing during a time when a column of pixel values is read out for SRAM banks, that is, the time when a new pixel matrix to be convolved is generated.

Preferably, the step S4 includes the following steps.

In step S41, the pixel values multiplied by the same weight in the Gaussian convolution kernel in the pixel matrix to be convoluted are added first to obtain the partial sums that can be reused by different Gaussian convolution kernels.

In step S42, the partial sums are divided into a plurality of groups of partial sums for time division multiplexing, the plurality of groups of partial sums complete the Gaussian convolution of M different scale coefficients in time division to form the octave of Gaussian images, and the plurality of octaves of Gaussian images form the Gaussian pyramid.

Preferably, coordinates of a center pixel value of a current pixel matrix are used for making determination. The edge padding is not performed if the center pixel value of the current pixel matrix to be convolved is located in a middle of the original image, and the edge padding is performed if the center pixel value of the current pixel matrix to be convolved is at an edge of the image. A pixel register of a shift register array caches a pixel value to be convolved. An edge padding register caches values required for different padding types, including zero-valued edge padding, constant edge padding, or repeated edge padding. Coordinate information of a center pixel value in current pixel matrix to be convoluted is used to control a multiplexer (MUX) in an N×N shift register array to select a pixel register of a shift register array to cache a pixel value to be convolved or an edge padding register to cache values required for different types of the edge padding, and a variety of reconfigurable edge padding effects are achieved in this way.

Preferably, through the symmetry of a Gaussian pyramid construction template, a method of reusing the partial sums of an input image is provided. To be specific, a convolution operation is a process in which a pixel value in a pixel matrix to be convolved is multiplied by a value at a corresponding position in a convolution kernel, and multiplied results are added together. Due to the symmetry of the Gaussian function, the pixel values in the pixel matrix to be convolved by the same weight are added first to obtain partial sums.

In another aspect, the disclosure further provides a reconfigurable hardware acceleration system for Gaussian pyramid construction, and the system includes N SRAM banks, N groups of first in first out (FIFO), an N-N switch network, an N×N shift register array, a Gaussian convolution operation module, and a Gaussian difference module.

The N SRAM banks are configured to store pixel data of an original image in a form of a line buffer in a slow clock domain and output a pixel matrix to be convoluted in parallel column by column.

The N groups of FIFO are configured to achieve a transformation from the slow clock domain to a fast clock domain.

The N-N switch network is configured to adjust a row order of the pixel matrix to be convolved in the fast clock domain, such that the pixel matrix to be convolved is outputted column by column after the pixel data written first is not covered.

The N×N shift register array is configured to cache the pixel matrix to be convoluted and edge padding values in the fast clock domain.

The Gaussian convolution operation module is configured to achieve construction of a Gaussian pyramid in the fast clock domain.

The Gaussian difference module is configured to differ Gaussian images of different scale coefficients in the same octave of Gaussian images outputted by the Gaussian convolution operation module in the fast clock domain to form a Gaussian difference pyramid.

Preferably, the Gaussian convolution operation module includes an adder tree, a demultiplexer, and H reconfigurable PE arrays.

During the time when a column of pixel values is read out for the SRAM banks in the fast clock domain, that is, a time when a new pixel matrix to be convolved is generated, the adder tree module is configured to add pixel values multiplied by a same weight in a Gaussian convolution kernel in the pixel matrix, so as to obtain partial sums that can be reused by different Gaussian convolution kernels.

During the time when a column of pixel values is read out for the SRAM banks in the fast clock domain, that is, the time when a new pixel matrix to be convolved is generated, the demultiplexer is configured to distribute the partial sums to a plurality of reconfigurable PE arrays in time division.

Regarding the reconfigurable PE arrays, during the time when a column of pixel values is read out for the SRAM banks in the fast clock domain, that is, the time when a new pixel matrix to be convolved is generated, time division multiplexing is performed on the configured plurality of reconfigurable PE arrays, and a Gaussian convolution of M scales of a pixel matrix to be convolved is completed based on the partial sums to form an octave of Gaussian images, and a plurality of octaves of Gaussian images form the Gaussian pyramid. The number of the reconfigurable PE arrays that perform the task of constructing the Gaussian pyramid and the Gaussian difference pyramid can be configured according to different scenarios and different tasks' requirements for system performance. An octave of Gaussian images of the Gaussian pyramid has M layers, and a Gaussian convolution operation speed is P times the reading and writing speed of the SRAM. The number of the reconfigurable PE arrays H≤⌈M/P⌉, where ⌈ ⌉ means rounding up, and the number of the configured reconfigurable PE arrays≤H.

Preferably, since the SRAM cache exhibits a slow reading and writing speed but the computational unit exhibits a fast operation speed, by utilizing the mismatch between the speed of the memory and the speed of the computational unit, the fast and slow dual clock domain design method is proposed. First, the FIFO is used to achieve a cross-clock domain, the SRAM works under the slow clock domain, and the computational unit works under the fast clock domain.

During the time when a column of pixel values is read out for the SRAM banks, that is, the time when a new pixel matrix to be convolved is generated, time division multiplexing is performed on the adder tree module, the demultiplexer, the configured reconfigurable PE arrays, and the Gaussian difference module to achieve convolution operations of different scales.

Preferably, when a convolution window is close to an edge of the input image, that is, when edge padding is required, through location features of the input image in the convolution of different scales of the Gaussian pyramid and a current convolution center pixel value position being treated as a control signal, a multiplexer (MUX) between the register group and the adder tree module is controlled. The MUX can dynamically select the input of the adder tree module as the pixel value in the shift register group or the value in the edge padding register, so as to achieve different types of reconfigurable edge padding, including zero-valued edge padding, constant edge padding, or repeated edge padding.

Preferably, through the symmetry of a Gaussian pyramid construction template, a method of reusing the partial sums of an input image is provided. To be specific, a convolution operation is a process in which a pixel value in a pixel matrix to be convolved is multiplied by a value at a corresponding position in a convolution kernel, and multiplied results are added together. Due to the symmetry of the Gaussian pyramid construction kernel, the pixel values in the convolution template multiplied by the same weight are added first to obtain partial sums.

The pixels in the original image are stored in N SRAM banks in a form of a line buffer under the slow clock domain, and pixel values to be convolved are outputted in parallel column by column. The transformation from the slow clock domain to the fast clock domain is achieved through N groups of FIFO. In the fast clock domain, the pixel values outputted by the N groups of FIFO are adjusted in order through a N-N switch network and are stored in a N×N shift register array column by column. In addition to the registers that store the original pixel values, the shift register array also has corresponding edge padding registers for caching the values required for different types of edge padding. Further, the shift register array achieves different types of reconfigurable edge padding, including zero-valued edge padding, constant edge padding, or repeated edge padding, by controlling the multiplexer (MUX). Due to the symmetry of the Gaussian convolution kernel, a weight value with a same distance from a center weight in the Gaussian convolution kernel is the same. In the disclosure, by utilizing this symmetry, the adder tree module first adds the pixel values in the matrix to be convolved multiplied by the same weight to obtain partial sums that can be reused by convolution of different scales of the Gaussian pyramid. Further, the adder tree module can calculate the partial sums of the input image required for M-layer convolution for time division multiplexing. According to different performance needs, several reconfigurable PE arrays are configured and used, and the number of the configured reconfigurable PE arrays is ≤H. The partial sums enter a plurality of reconfigurable PE arrays through a demultiplexer (DEMUX) to complete convolution operations of different scales to achieve construction of the reconfigurable Gaussian pyramid. Gaussian pyramid data enters the Gaussian difference module to complete the construction of the Gaussian difference pyramid.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 2 is a working flow chart of the reconfigurable hardware acceleration system of the Gaussian pyramid construction algorithm according to the disclosure.

FIG. 6 is a schematic diagram of two PE arrays in the reconfigurable hardware acceleration system of the Gaussian pyramid construction algorithm according to the disclosure.

DESCRIPTION OF THE EMBODIMENTS

Figure 1:
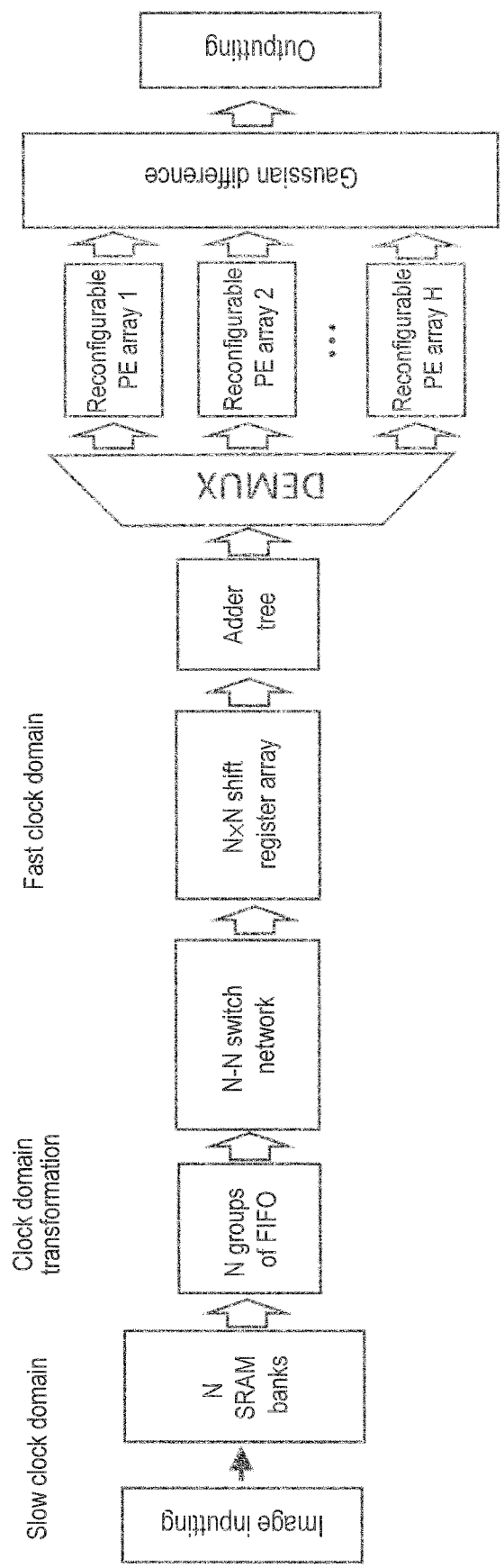
FIG. 1 is a hardware architecture diagram of a reconfigurable hardware acceleration system of a Gaussian pyramid construction algorithm according to the disclosure.

In order to make the objectives, technical solutions, and advantages of the disclosure clearer and more comprehensible, the disclosure is further described in detail with reference to the drawings and embodiments. It should be understood that the specific embodiments described herein serve to explain the disclosure merely and are not used to limit the disclosure. In addition, the technical features involved in the various embodiments of the disclosure described below can be combined with each other as long as the technical features do not conflict with each other.

The disclosure provides a reconfigurable hardware acceleration method for Gaussian pyramid construction, and the method includes the following steps.

In step S1, pixel data of an original image is stored in a form of a line buffer, and a pixel matrix to be convolved is outputted in parallel column by column.

In step S2, a row order of the pixel matrix to be convoluted is adjusted, such that the pixel data written before is not covered.

In step S3, whether or not to perform edge padding and data for edge padding are selected by using coordinate information of a center pixel value of the pixel matrix to be convoluted.

In step S4, pixel values multiplied by a same weight in a Gaussian convolution kernel in the pixel matrix to be convoluted are added first to obtain partial sums that can be reused by different Gaussian convolution kernels, a Gaussian convolution operation of M different scale coefficients is completed to form an octave of Gaussian images, and a plurality of octaves of Gaussian images form a Gaussian pyramid.

In step S5, Gaussian images of different scale coefficients in the same octave of Gaussian images are differed to form an octave of Gaussian difference images, and a plurality of groups of Gaussian difference images form a Gaussian difference pyramid.

To be specific, since a static random access memory (SRAM) cache exhibits a slow reading and writing speed, while a computational unit exhibits a fast speed, by utilizing the mismatch between the speed of the memory and the speed of the computational unit, a fast and slow dual clock domain design method is provided. To be specific, the pixel matrix to be convolved outputted in step S1 first undergoes a transformation from a slow clock domain to a fast clock domain, and it is assumed that the speed of the computational unit is P times the reading and writing speed of the SRAM.

To be specific, the step S4 includes the following steps.

In step S41, the pixel values multiplied by the same weight in the Gaussian convolution kernel in the pixel matrix to be convoluted are added first to obtain the partial sums that can be reused by different Gaussian convolution kernels.

In step S42, the partial sums are divided into a plurality of groups for time division multiplexing, the Gaussian convolution of M different scale coefficients are completed in time division to form an octave of Gaussian images, and a plurality of octaves of Gaussian images form the Gaussian pyramid.

To be specific, coordinates of a center pixel value of a current pixel matrix are used for making determination. The edge padding is not performed if the center pixel value of the current pixel matrix to be convolved is located in a middle of the original image, and the edge padding is performed if the center pixel value of the current pixel matrix to be convolved is at an edge of the image. A pixel register of a shift register array caches a pixel value to be convolved. An edge padding register caches values required for different padding types including zero-valued edge padding, constant edge padding, or repeated edge padding.

To be specific, through the symmetry of a Gaussian pyramid construction template, a method of reusing the partial sums of an input image is provided. To be specific, a convolution operation is a process in which a pixel in a pixel matrix to be convolved is multiplied by a value at a corresponding position in a convolution kernel, and multiplied results are added together. Due to the symmetry of the Gaussian pyramid construction kernel, the pixel values in the convolution template multiplied by the same weight are added first to obtain partial sums.

The disclosure further provides a reconfigurable hardware acceleration system for Gaussian pyramid construction, and the system includes N SRAM banks, N groups of first in first out (FIFO), an N-N switch network, an N×N shift register array, a Gaussian convolution operation module, and a Gaussian difference module.

The N SRAM banks are configured to store pixel data of an original image in a form of a line buffer in a slow clock domain and output a pixel matrix to be convoluted in parallel column by column.

The N groups of FIFO are configured to achieve a transformation from the slow clock domain to a fast clock domain.

The N-N switch network is configured to adjust a row order of the pixel matrix to be convolved in the fast clock domain, such that the pixel matrix to be convolved is outputted column by column after the pixel data written first is not covered.

The N×N shift register array is configured to cache the pixel matrix to be convoluted and edge padding values in the fast clock domain.

The Gaussian convolution operation module is configured to achieve construction of a Gaussian pyramid in the fast clock domain.

The Gaussian difference module is configured to differ Gaussian images of different scale coefficients in the same octave of Gaussian images outputted by the Gaussian convolution operation module in the fast clock domain to form a Gaussian difference pyramid.

To be specific, the Gaussian convolution operation module includes an adder tree module, a demultiplexer, and H reconfigurable PE arrays.

During the time when a column of pixel values is read out for the SRAM banks in the fast clock domain, that is, a time when a new pixel matrix to be convolved is generated, the adder tree module is configured to add pixel values multiplied by a same weight in a Gaussian convolution kernel in the pixel matrix, so as to obtain partial sums that can be reused by different Gaussian convolution kernels.

During the time when a column of pixel values is read out for the SRAM banks in the fast clock domain, that is, the time when a new pixel matrix to be convolved is generated, the demultiplexer (DEMUX) is configured to distribute the partial sums to a plurality of reconfigurable PE arrays in time division.

The H reconfigurable PE arrays can be configured with the number of reconfigurable PE arrays that perform the task of constructing the Gaussian pyramid and the Gaussian difference pyramid according to different scenarios and different tasks' requirements for system performance. During a time when a column of pixel values is read out for a read group in the fast clock domain, that is, the time when a new pixel matrix to be convolved is generated, time division multiplexing is performed on the configured plurality of reconfigurable PE arrays, and a Gaussian convolution of M scales of a pixel matrix to be convolved is completed based on the partial sums. As such, the Gaussian convolution operation of M different scale coefficients of the input image is completed to form an octave of Gaussian images, and a plurality of octaves of Gaussian images form the Gaussian pyramid.

To be specific, since the SRAM cache exhibits a slow reading and writing but the computational unit exhibits a fast speed, by utilizing the mismatch between the speed of the memory and the speed of the computational unit, the fast and slow dual clock domain design method is proposed. First, the FIFO is used to achieve a cross-clock domain, the SRAM works under the slow clock domain, and the computational unit works under the fast clock domain. During the time when a column of pixel values is read out for the SRAM banks, that is, the time when a new pixel matrix to be convolved is generated, time division multiplexing is performed on the adder tree module, the demultiplexer, the configured reconfigurable PE arrays, and the Gaussian difference module to achieve convolution operations of different scales.

To be specific, when a convolution window is close to an edge of the input image, that is, when edge padding is required, through location features of the input image in the convolution of different scales of the Gaussian pyramid and a current convolution center pixel value position being treated as a control signal, a multiplexer (MUX) between a register group and the adder tree module is controlled. The MUX can dynamically select the input of the adder tree module as the pixel value in the shift register group or the value in the edge padding register, so as to achieve different types of the edge padding, including zero-valued edge padding, constant edge padding, or repeated edge padding.

To be specific, through the symmetry of a Gaussian pyramid construction template, a method of reusing the partial sums of an input image is provided. To be specific, a convolution operation is a process in which a pixel value in a pixel matrix to be convolved is multiplied by a value at a corresponding position in a convolution kernel, and multiplied results are added together.

Due to the symmetry of the Gaussian pyramid construction kernel, the pixel values in the convolution template multiplied by the same weight are added first to obtain partial sums.

In this embodiment, for instance, the input image of VGA (640×480) size is adopted, and sizes of the Gaussian pyramid construction kernel are 3×3, 5×5, 7×7, 9×9, 11×11, and 13×13, that is, N=13, and M=6, P=4, and H=2.

As shown in FIG. 1, the disclosure provides a reconfigurable hardware acceleration system of a Gaussian pyramid construction algorithm. The following is an example of Gaussian pyramid construction with kernel sizes of 3×3, 5×5, 7×7, 9×9, 11×11, and 13×13. Correspondingly, the system architecture includes 13 SRAM banks, 13 groups of FIFO, 13-13 switch network, 13×13 shift register array, an adder tree, a demultiplexer (DEMUX), two reconfigurable PE arrays, and a Gaussian difference module. Herein, the 13 banks of SRAM cache original image pixels and output 13 pieces of data in parallel. The 13 groups of FIFO perform the transformation from the slow clock domain to the fast clock domain. The 13-13 switch network adjusts data and ensures the correctness of the data in the shift register array. The 13×13 shift register array caches the pixel matrix to be convoluted, and the edge padding register (reg) (not shown) caches the values required for different types of edge padding and controls the multiplexer (MUX) (not shown) to achieve different types of the edge padding, including zero-valued edge padding, constant edge padding, or repeated edge padding. The adder tree adds the corresponding pixel values multiplied by the same weight to obtain the partial sums that can be reused by convolution of different scales of the Gaussian pyramid. The demultiplexer (DEMUX) distributes the partial sums required for the adder tree. According to the requirements of different scenarios and different tasks for the system, two or one reconfigurable PE array can be configured to implement 6-scale convolution operation in the fast clock domain to construct the Gaussian pyramid. The Gaussian difference module differs the Gaussian images at different scales to construct the Gaussian difference pyramid.

FIG. 2 is a working flow chart illustrating the reconfigurable hardware acceleration system of the Gaussian pyramid construction algorithm according to the disclosure.

Figure 3:
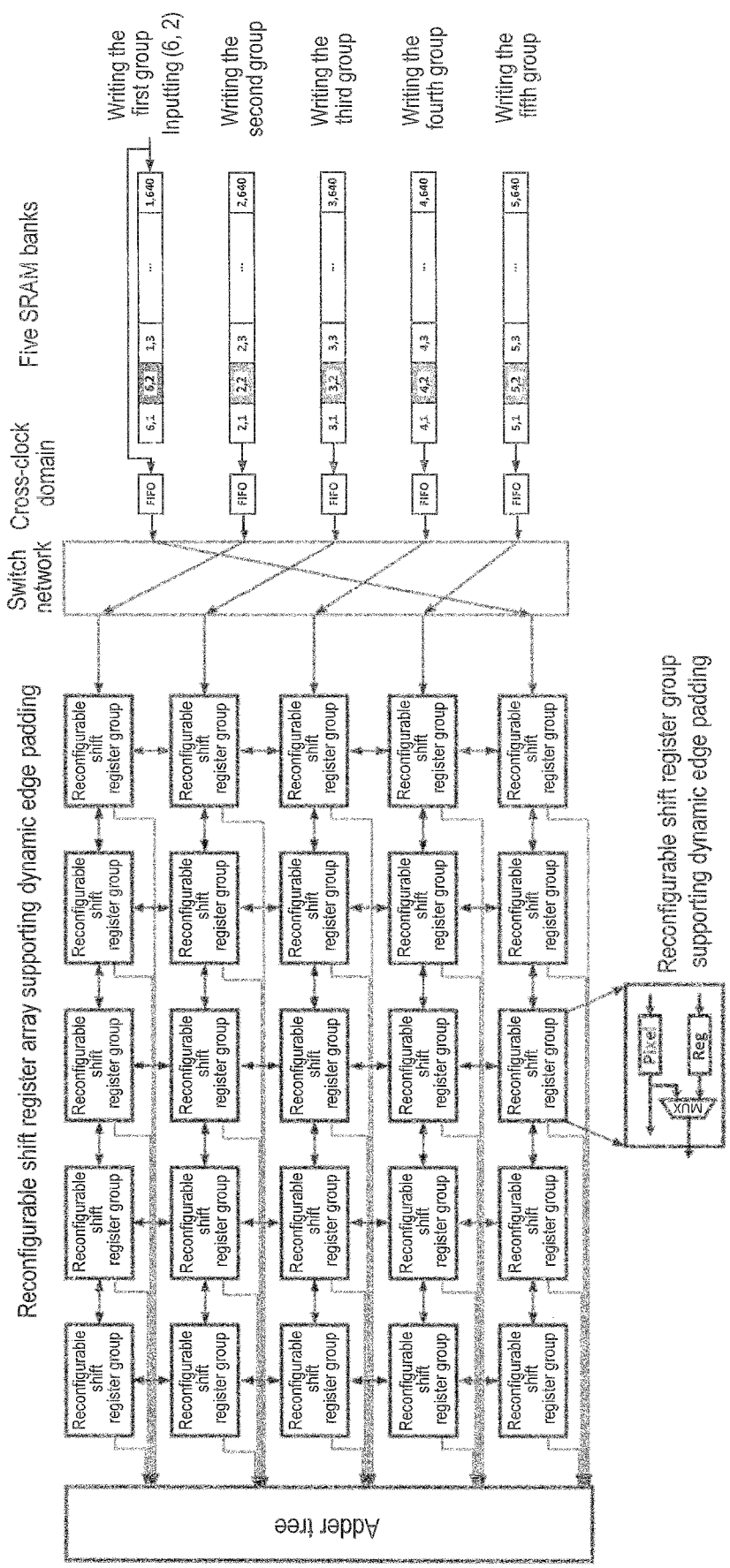
FIG. 3 is a schematic diagram of a plurality of static random access memories (SRAM) banks, a switch network, and a reconfigurable shift register array (taking N=5 as an example) supporting dynamic edge padding in the reconfigurable hardware acceleration system of the Gaussian pyramid construction algorithm according to the disclosure.

As shown in FIG. 3, taking 5 SRAM banks as an example, the operation method of the SRAM banks, the FIFO group, the switch network, and the shift register array is described. The pixels in the original image are stored in 5 SRAM banks in a form of a line buffer under the slow clock domain, and the 5 SRAM banks output pixel values to be convolved in parallel. The transformation from the slow clock domain to the fast clock domain is achieved through 5 groups of FIFO. In the fast clock domain, the pixel values outputted by the 5 groups of FIFO are adjusted in order through a 5-5 switch network and are stored in a 5×5 shift register array column by column. In addition to the registers that store the original pixel values, the shift register array also has corresponding edge padding registers for caching the values required for different types of edge padding. Besides, the shift register array, through the location features of the input image in the convolution of different scales of the Gaussian pyramid, achieves different types of edge padding, including zero-valued edge padding, constant edge padding, or repeated edge padding, by controlling the multiplexer (MUX).

Figure 4:
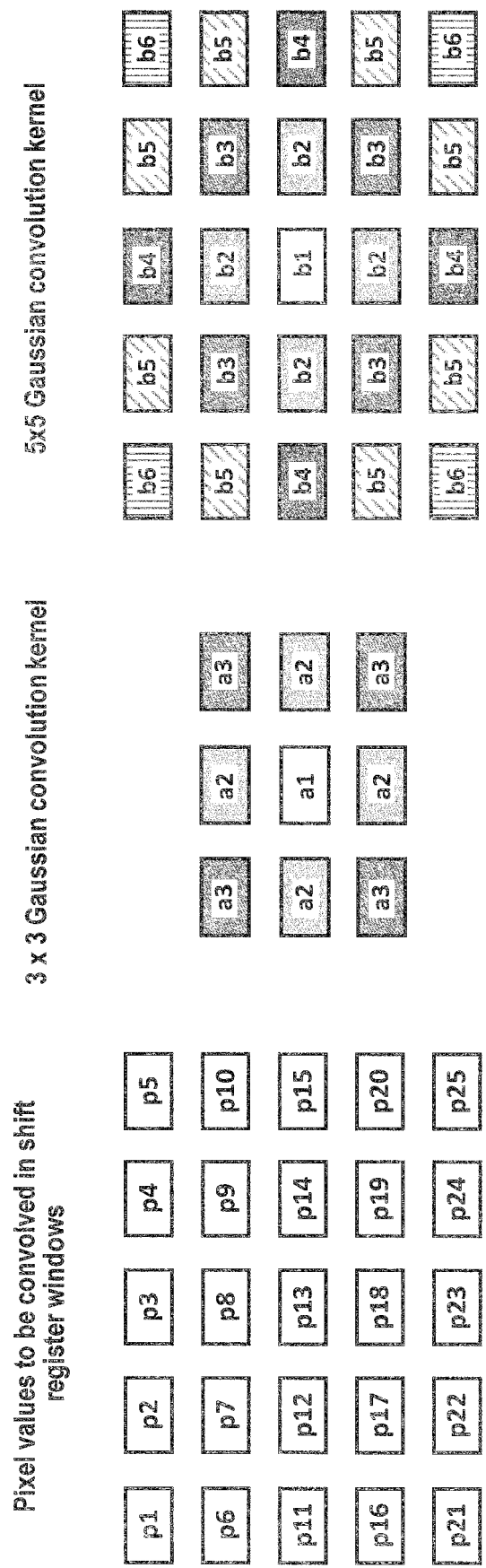
FIG. 4 is a schematic diagram of a pixel matrix to be convolved and a Gaussian convolution kernel (taking a size of the convolution kernel as 3×3 and 5×5 as an example) according to the disclosure.

As shown in FIG. 4, the Gaussian convolution kernel has symmetry, and a weight value of a same distance from a center weight in the Gaussian convolution kernel is also the same. In the same convolution kernel, different background gray levels or shadows represent different weight values, and the same background gray levels or shadows represent the same weight value. Taking the 5×5 Gaussian convolution kernel as an example, a central value weight (b1, no other weight value is the same as it), four weights with the same value (b2, b3, b4, and b6) and eight weights with the same value (b5), a total of 6 different weight values, are provided.

Figure 5:
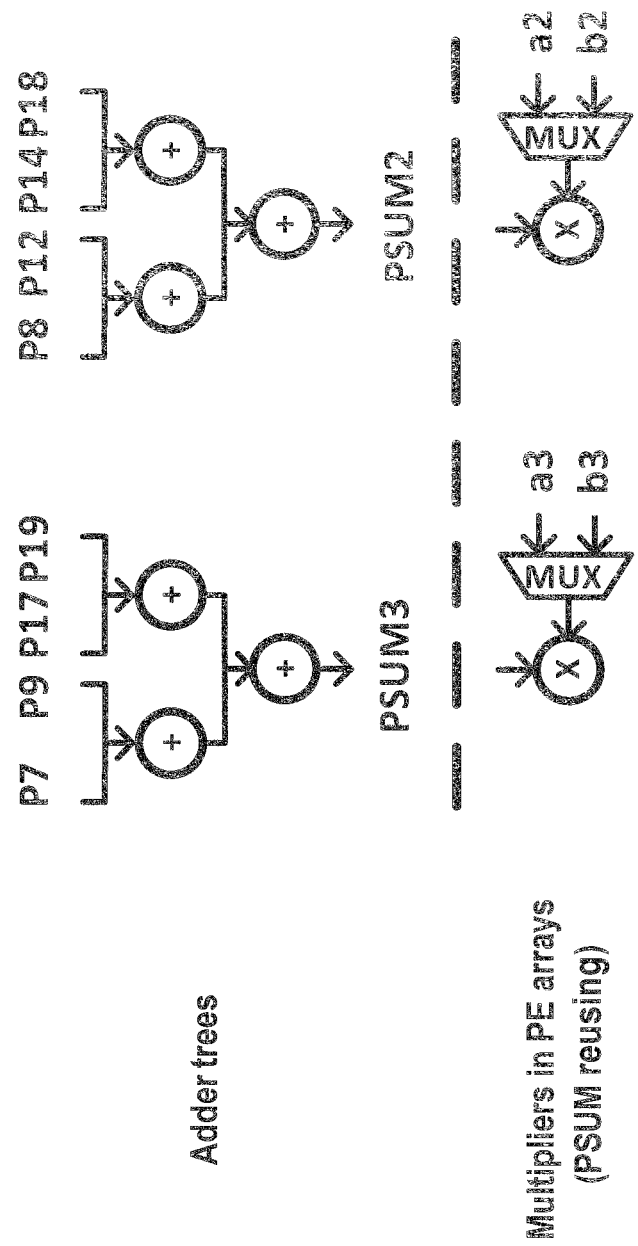
FIG. 5 is a schematic diagram of an adder tree and a partial sum reusing manner in the reconfigurable hardware acceleration system of the Gaussian pyramid construction algorithm according to the disclosure.

In the disclosure, by utilizing this symmetry, as shown in FIG. 5, the adder tree first adds the pixel values in the pixel matrix to be convolved multiplied by the same weight to obtain partial sums that can be reused by convolution of different scales of the Gaussian pyramid. The partial sums can be multiplied by the 3×3 convolution kernel weight and the 5×5 convolution kernel weight to complete convolution operations of different scales. Further, the adder tree can calculate the partial sums of the input image required for 9×9 convolution, the partial sums of input image required for 11×11 convolution, and the partial sums of input image required for 13×13 convolution for time division multiplexing. Herein, the partial sums of the input image required for 9×9 convolution include the partial sums of the input image required for 3×3 convolution, 5×5 convolution, and 7×7 convolution. The partial sums of the input image required for the 11×11 convolution can reuse the partial sums of the input image required for the 9×9 convolution. Therefore, when the partial sums of the input image required by the 11×11 convolution are calculated, only the part of the 11×11 input image pixel matrix that is more than the 9×9 input image pixel matrix needs to be calculated. The calculation of the partial sums required for the 13×13 convolution is the same.

As shown in FIG. 6, it is a schematic diagram of two reconfigurable PE arrays in this embodiment.

Taking configuring two reconfigurable PE arrays to perform Gaussian pyramid and Gaussian difference pyramid construction as an example, two reconfigurable PE arrays are designed.

A reconfigurable PE array 1 calculates 13×13, 11×11, 9×9 Gaussian convolutions in time division, the number of multipliers in the reconfigurable PE array 1 is designed to be the number of different weight values in the calculated maximum convolution kernel (13×13). For the weights in the 13×13 Gaussian convolution kernel, three distributions are provided, namely the central value weight mentioned in FIG. 4, the four weights with the same value, and the eight weights with the same value, so a total of 28 different weight values are provided. Therefore, 28 multipliers are used for parallel calculation, and an adder tree formed by 27 adders is used to complete the convolution calculation.

The reconfigurable PE array 2 calculates 3×3, 5×5, 7×7 Gaussian convolutions in time division, the number of multipliers in the reconfigurable PE array 2 is designed to be the number of different weight values in the calculated maximum convolution kernel (7×7). For the weights in the 7×7 Gaussian convolution kernel, three distributions are provided, namely the central value weight mentioned in FIG. 4, the four weights with the same value, and the eight weights with the same value, so a total of 10 different weight values are provided. Therefore, 10 multipliers are used for parallel calculation, and after the multiplication is calculated in parallel, an adder tree formed by 9 adders is used to complete the convolution calculation.

According to different performance needs, the partial sums can enter one or two reconfigurable PE arrays through the demultiplexer (DEMUX) to complete convolution operations of different scales.

If the system is reconfigured to use two reconfigurable PE arrays, that is, the reconfigurable PE array 1 and the reconfigurable PE array 2, during the time when a column of pixel values is read out for the SRAM banks, the reconfigurable PE array 1 can calculate the Gaussian convolution of 13×13, 11×11, and 9×9 in time division for the distribution of the partial sums through the demultiplexer DEMUX, and the reconfigurable PE array 2 can calculate the Gaussian convolution of 15×15, 21×21, and 13×13 in time division for the distribution of the partial sums through the DEMUX. In a low-speed scenario, the system can also be reconfigured to use one reconfigurable PE array. For instance, it is assumed that the reconfigurable PE array 1 is used, and the reconfigurable PE array 1 can calculate the Gaussian convolution of 3×3, 5×5, 7×7, 9×9, 11×11, and 13×13 in time division for the distribution of the partial sums through the demultiplexer (DEMUX), the reconfigurable PE array 2 can be called by other modules to complete other tasks, and construction of the reconfigurable Gaussian pyramid is achieved.

Figure 7:
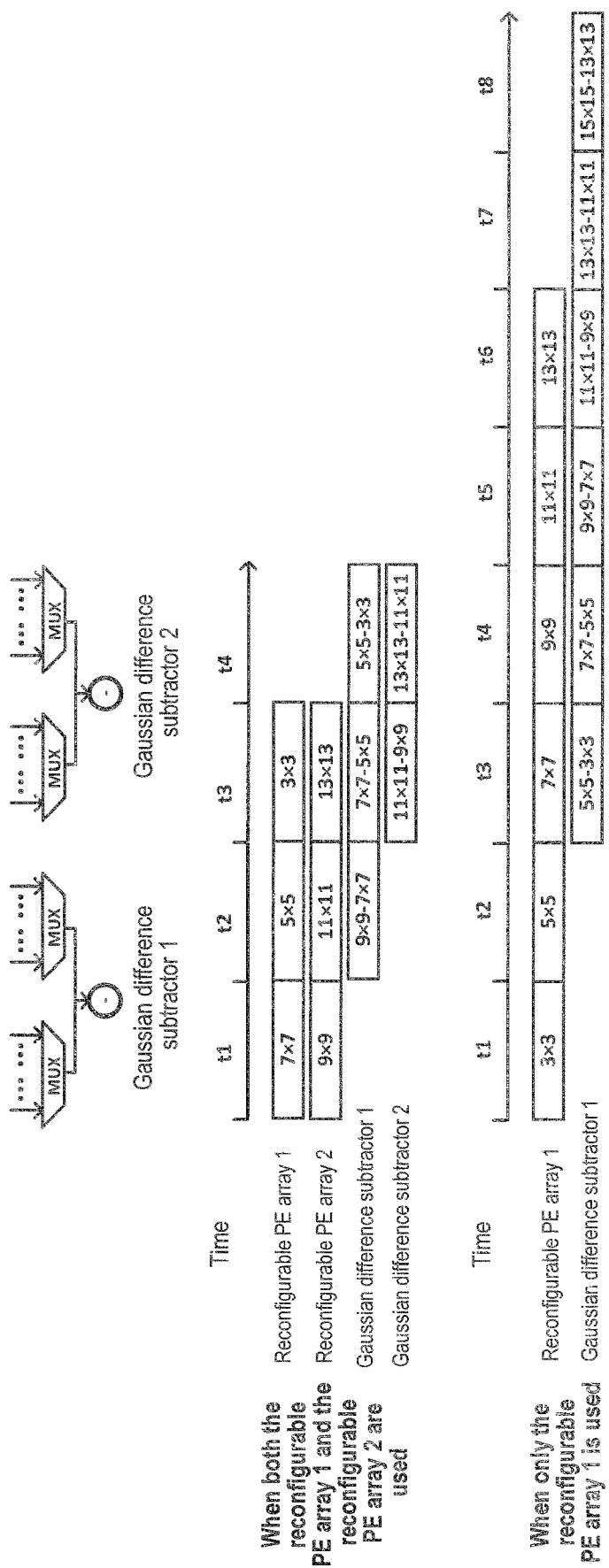
FIG. 7 is a schematic diagram of a calculation sequence and a Gaussian difference unit during a time when a column of pixel values is read out for the SRAM banks, that is, a time when a new pixel matrix to be convolved is generated in the reconfigurable hardware acceleration system of the Gaussian pyramid construction algorithm according to the disclosure.

As shown in FIG. 7, hardware implementation and an operation sequence of the Gaussian difference module are given. For instance, the differential operation is performed during the time when a column of pixel values is read out for the SRAM banks, that is, the time when a new pixel matrix to be convolved is generated.

If the system is reconfigured to use two reconfigurable PE arrays, two subtractors are required to be reused in time division to construct the Gaussian difference pyramid. At time t1, the reconfigurable PE array 1 and the reconfigurable PE array 2 respectively calculate a 7×7 Gaussian convolution and a 9×9 Gaussian convolution. At time t2, the reconfigurable PE array 1 and the reconfigurable PE array 2 respectively calculate a 5×5 Gaussian convolution and a 11×11 Gaussian convolution, and a Gaussian subtractor 1 calculates the difference between the calculation result of the 9×9 Gaussian convolution and the calculation result of the 7×7 Gaussian difference convolution. At time t3, the reconfigurable PE array 1 and the reconfigurable PE array 2 respectively calculate a 3×3 Gaussian convolution and a 13×13 Gaussian convolution, and the Gaussian difference subtractor 1 and a Gaussian difference subtractor 2 respectively calculate the difference between the calculation result of the 7×7 Gaussian convolution and the calculation result of the 5×5 Gaussian convolution and the difference between the calculation result of the 11×11 Gaussian convolution and the calculation result of the 9×9 Gaussian convolution. At time t4, the Gaussian difference subtractor 1 and the Gaussian difference subtractor 2 respectively calculate the difference between the calculation result of the 5×5 Gaussian convolution and the calculation result of the 3×3 Gaussian convolution and the difference between the calculation result of the 13×13 Gaussian convolution and the calculation result of the 11×11 Gaussian convolution.

If the system is reconfigured to use one reconfigurable PE array, e.g., the reconfigurable PE array 1, only one subtractor needs to be reused in time division to construct the Gaussian difference pyramid, and the reconfigurable PE array 1 calculates a 3×3 Gaussian convolution at time t1. At time t2, the reconfigurable PE array 1 calculates a 5×5 Gaussian convolution. At time t3, the reconfigurable PE array 1 calculates a 7×7 Gaussian convolution, and the Gaussian subtractor 1 calculates the difference between the calculation result of the 5×5 Gaussian convolution and the calculation result of the 3×3 Gaussian difference convolution. At time t4, the reconfigurable PE array 1 calculates a 9×9 Gaussian convolution, and the Gaussian subtractor 1 calculates the difference between the calculation result of the 7×7 Gaussian convolution and the calculation result of the 5×5 Gaussian difference convolution. At time t5, the reconfigurable PE array 1 calculates a 11×11 Gaussian convolution, and the Gaussian subtractor 1 calculates the difference between the calculation result of the 9×9 Gaussian convolution and the calculation result of the 7×7 Gaussian difference convolution. At time t6, the reconfigurable PE array 1 calculates a 13×13 Gaussian convolution, and the Gaussian subtractor 1 calculates the difference between the calculation result of the 11×11 Gaussian convolution and the calculation result of the 9×9 Gaussian difference convolution. At time t7, the Gaussian subtractor 1 calculates the difference between the calculation result of the 13×13 Gaussian convolution and the calculation result of the 11×11 Gaussian difference convolution. At time t8, the Gaussian subtractor 1 calculates the difference between the calculation result of the 15×15 Gaussian convolution and the calculation result of the 13×13 Gaussian difference convolution.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A reconfigurable hardware acceleration method for Gaussian pyramid construction, comprising:
   step S1: storing pixel data of an original image in a form of a line buffer and outputting a pixel matrix to be convoluted in parallel column by column;
   step S2: adjusting a row order of the pixel matrix to be convoluted, such that the pixel data written first is not covered;
   step S3: selecting whether or not to perform edge padding and data for the edge padding by using coordinate information of a center pixel value of the pixel matrix to be convoluted;
   step S4: adding pixel values multiplied by a same weight in a Gaussian convolution kernel in the pixel matrix to be convoluted first to obtain partial sums that can be reused by different Gaussian convolution kernels, completing a Gaussian convolution operation of M different scale coefficients based on the partial sums to form an octave of Gaussian images, and forming a Gaussian pyramid from a plurality of octaves of Gaussian images; and
   step S5: differing Gaussian images of different scale coefficients in the same octave of Gaussian images to form an octave of Gaussian difference images and forming a Gaussian difference pyramid from a plurality of groups of Gaussian difference images.

2. The method according to claim 1, wherein the pixel matrix to be convolved outputted in the step S1 undergoes a transformation from a slow clock domain to a fast clock domain, and the step S2 is then performed.

3. The method according to claim 1, wherein the step S4 specifically comprises the following steps:
   step S41: adding the pixel values multiplied by the same weight in the Gaussian convolution kernel in the pixel matrix to be convoluted first to obtain the partial sums that can be reused by different Gaussian convolution kernels; and
   step S42: dividing the partial sums into a plurality of groups of partial sums for time division multiplexing, completing, by the plurality of groups of partial sums, the Gaussian convolution of M different scale coefficients in time division to form an octave of Gaussian images, and forming the Gaussian pyramid from a plurality of octaves of Gaussian images.

4. The method according to claim 1, wherein in the step S3, edge filling is not performed when the center pixel value of the pixel matrix to be convolved is located in a middle of the original image, the edge filling is performed when the center pixel value of the pixel matrix to be convolved is at an edge of the image, and the edge filling comprises zero-valued edge filling, constant edge filling, or repeated edge filling.

5. A reconfigurable hardware acceleration system for Gaussian pyramid construction, comprising:
   N static random access memories (SRAMs) banks, configured to store pixel data of an original image in a form of a line buffer in a slow clock domain and output a pixel matrix to be convoluted in parallel column by column;
   N groups of first in first out (FIFO), configured to achieve a transformation from the slow clock domain to a fast clock domain;
   an N-N switch network, configured to adjust a row order of the pixel matrix to be convolved in the fast clock domain, such that the pixel matrix to be convolved is outputted column by column after the pixel data written first is not covered;
   an N×N shift register array, configured to cache the pixel matrix to be convoluted and an edge padding value in the fast clock domain;
   a Gaussian convolution operation module, configured to achieve construction of a reconfigurable Gaussian pyramid in the fast clock domain; and
   a Gaussian difference module, configured to differ Gaussian images of different scale coefficients in the same octave of Gaussian images outputted by the Gaussian convolution operation module in the fast clock domain, wherein different groups of Gaussian difference results form a Gaussian difference pyramid.

6. The system according to claim 5, wherein the Gaussian convolution operation module comprises:
   an adder tree module, configured to add pixel values multiplied by a same weight in a Gaussian convolution kernel in the pixel matrix during a time when a column of pixel values is read out for the N SRAM banks in the fast clock domain, that is, a time when a new pixel matrix to be convolved is generated, to obtain partial sums that can be reused by different Gaussian convolution kernels;
   a demultiplexer, distributing the partial sums to a plurality of reconfigurable processing element (PE) arrays in time division during the time when the column of pixel values is read out for the N SRAMs banks in the fast clock domain, that is, the time when a new pixel matrix to be convolved is generated; and
   H reconfigurable PE arrays, wherein time division multiplexing is performed on the configured reconfigurable PE arrays, and a Gaussian convolution operation of the partial sums of M different scale coefficients is performed and completed based on the partial sums to form an octave of Gaussian images during the time when the column of pixel values is read out for the N SRAMs banks in the fast clock domain, that is, the time when a new pixel matrix to be convolved is generated, wherein a plurality of octaves of Gaussian images form a Gaussian pyramid.

7. The system according to claim 6, wherein an octave of Gaussian images of the Gaussian pyramid has M layers, a Gaussian convolution operation speed is P times a reading and writing speed of the SRAM, and a number of the reconfigurable PE arrays $H=\lceil M/P \rceil$, where $\lceil \; \rceil$ means rounding up, and a number of the configured reconfigurable PE arrays≤H.

8. The system according to claim 5, wherein the N×N shift register array further comprises a multiplexer (MUX) configured to select whether or not to perform edge padding and data for the edge padding by using coordinate information of a center pixel value of a current pixel matrix to be convoluted.

9. The system according to claim 8, wherein the edge padding is not performed when the center pixel value of the current pixel matrix to be convolved is located in a middle of the original image, the edge padding is performed when the center pixel value of the current pixel matrix to be convolved is at an edge of the image, and the edge filling comprises zero-valued edge padding, constant edge padding, or repeated edge padding.

* * * * *